March 26, 1963     B. F. CALCIANO     3,082,606
SEAL AND SECURING MEANS FOR IRRIGATION STANDPIPE FLOW REGULATOR
Filed May 16, 1960
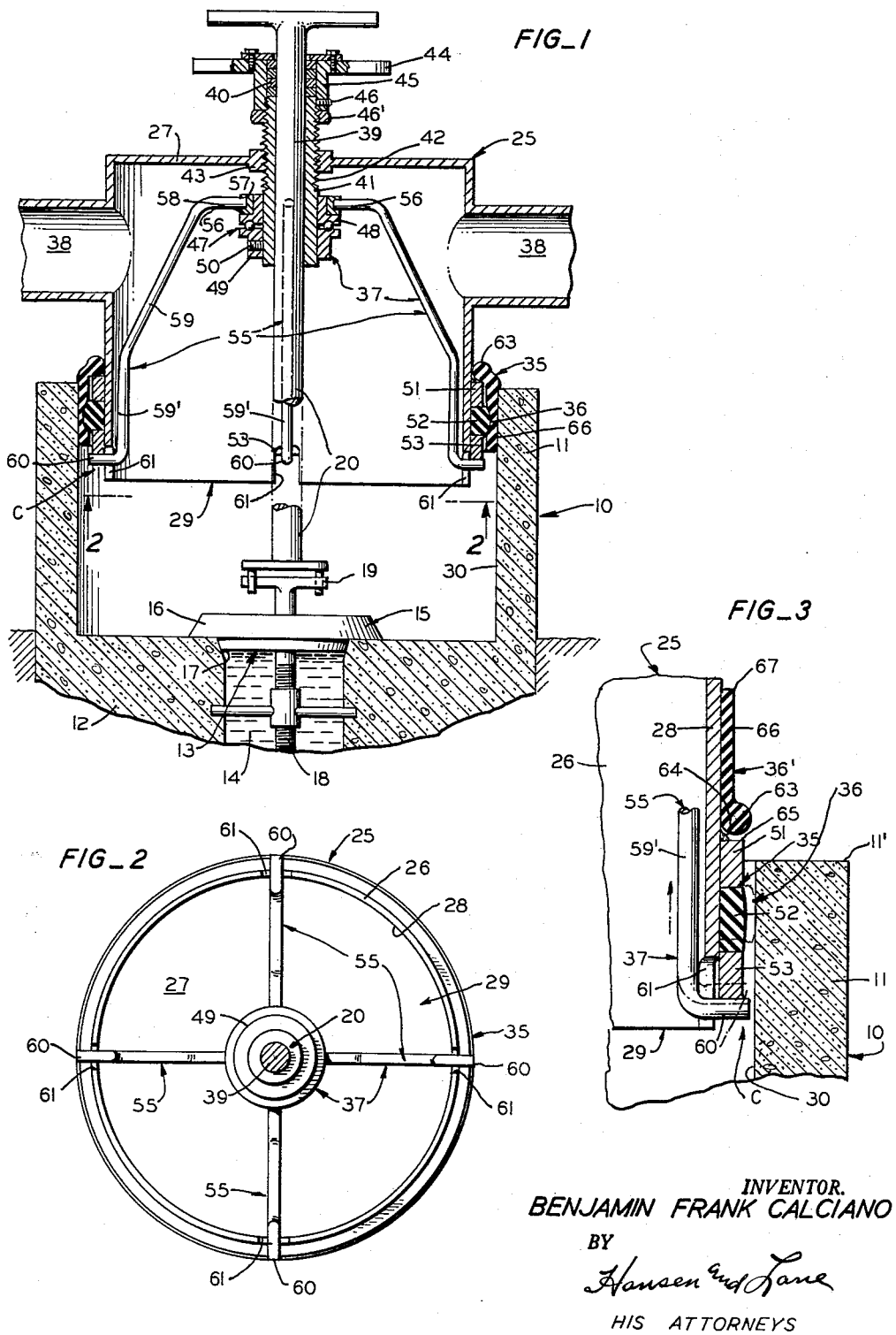
INVENTOR.
BENJAMIN FRANK CALCIANO
BY
*Hansen and Lane*
HIS ATTORNEYS United States Patent Office 3,082,606
Patented Mar. 26, 1963

3,082,606
SEAL AND SECURING MEANS FOR IRRIGATION STANDPIPE FLOW REGULATOR
Benjamin Frank Calciano, Lancaster, Calif., assignor to Cal-Hydrant Corporation, Lamont, Calif.
Filed May 16, 1960, Ser. No. 29,373
11 Claims. (Cl. 61—12)

This invention relates to irrigation flow regulating apparatus and more particularly to a novel arrangement for securing the flow regulator to an irrigation standpipe for controlling the flow of water therefrom.

The present invention is particularly designed for use in connection with round throated irrigation standpipes. These standpipes rise up out of the ground as terminal ends of a source of supply of irrigation water and are normally provided with a valve at their base by which to regulate the flow of water from such source of supply into the standpipe.

Normally, as the water rises up in the standpipe and eventually overflows from the top rim thereof it flows into irrigation ditches or flumes for transmission to row crops and the like. From this it will be appreciated that much of the water is wasted by reason of its loss at and around the standpipe. Moreover, flooding occurs around the standpipe and the earth thereabout becomes muddy and soggy making it difficult for workmen to carry out their tasks particularly in getting to and adjusting the valve by which the flow of water is regulated.

The present invention contemplates the provision of means for capping and controlling the flow of water from the standpipe to thereby minimize the loss of water around the standpipe and ultimate flooding of the area surrounding the standpipe. This broad general idea is disclosed in my co-pending application Serial No. 769,845, now Patent No. 3,024,613 filed October 27, 1958, in the United States Patent Office.

The present invention has an object to provide a simple and effective arrangement for quickly capping the standpipe and the provision of a novel seal and apparatus for effecting the same.

The invention is embodied in an arrangement including an inverted hood or pot dimensioned to fit within a conventional, round irrigation standpipe and resides in the provision of a novel gasket between the external wall of the hood and the internal wall of the standpipe and means for expanding said gasket to provide a water tight seal while securing the hood to the standpipe. The foregoing arrangement is particularly suited for use and operation in combination with the key by which the flow valve in the standpipe is regulated.

Another object is to provide a simple shim sleeve in combination with the foregoing gasket and seal facilitating adaptability of the same to standpipes of various sizes.

It is another object to provide a seal of the character mentioned above facilitating sealed securing of a flow regulator to standpipes with broken or irregularly shaped cap edges.

These and other objects and advantages will become apparent from a reading of the following description in the light of the drawing in which:

FIG. 1 is a vertical cross section through a conventional standpipe and valve therefor having the device of the present invention associated therewith.

FIG. 2 is a bottom plan view of the flow regulator and seal as seen from line 2—2 of FIG. 1.

FIG. 3 is a fragmentary sectional detail of the seal shown in FIGS. 1 and 2 at slightly greater scale and with a certain part thereof in a different position.

In FIG. 1 there is shown a conventional concrete standpipe 10 consisting of a cylindrical wall 11 formed monolithically with a base foundation 12 over the discharge end 13 of an underground pipeline 14 coming from a source of water supply. The standpipe 10 stands erect, open end up above the surface of the earth so that water rising out of the standpipe would normally overflow therefrom for direction along irrigation ditches or flumes toward field or row crops and/or trees for irrigating the same.

The conventional standpipe is provided with a valve 15 at the discharge end 13 of the source of water supply. This valve 15 is usually a screw actuated valve head 16 adapted to be pressed down upon a valve seat 17 formed at the mouth of the discharge opening 13. The valve head 16 is carried by a screw shaft 18 having a hand lever 19 at its upper end adapted to receive a key 20 by which the screw shaft 18 can be turned to close and/or open the valve 15.

A flow regulator 25 in the form of a pot-like hood 26 has a cylindrical wall 28 adapted to fit into the cylindrical wall 11 provided by the standpipe 10. One end of the cylinder 28 is closed by an integral panel 27 forming the top of the pot-like hood 26. The pot-like hood 26 is inverted so as to have its open end 29 down for communication with the interior of the standpipe 10. The cylinder 28 is of a diameter slightly less than that of the internal diameter of the standpipe to afford an annular clearance C, between them so that the flow regulator can be easily inserted and/or withdrawn relative to the standpipe.

Means 35 comprising a gasket 36 provides a seal between the cylindrical wall 28 of the hood and the internal surface 30 of the cylindrical wall 11 of the standpipe. The present invention resides in the gasket 36 per se and means 37 for effecting the same to provide a water tight seal and to secure the flow regulator to the standpipe.

With the water tight seal thus achieved and the inverted hood 26 secured to the standpipe 10 water may be admitted into the latter upon opening of the valve 15 with assurance that the water will not spill over the top surface 11' of the standpipe. The hood 26 is provided with discharge throats 38 which extend radially for ready connection to flume or irrigation pipe (not shown) for controlled transit to remote areas requiring irrigation.

The key 20 by which operation of the valve 15 is controlled has a shank 39 which extends through a packing gland 40 provided in a sleeve 41 which extends through the top panel 27 of the hood 26.

The sleeve 41 is formed as a part of the means 37 for effecting operation of the seal 35. To this end the sleeve 41 has an external thread 42 fitting a threaded boss 43 welded or otherwise secured concentrically of the round top 27 of the hood. An operating handle 44 has a hub 45 thereon secured to the upper end of the sleeve 41 by a set screw and lock nut 46 and 46', respectively. The aforementioned packing gland 40 is within the hub 45 to surround the key shank 39 to prevent water from rising through the sleeve 41.

The lower end of the sleeve 41 extends downward concentrically of the hood 26 to receive a thrust bearing 47 within the hood. This bearing 47 has an upper race 48 freely rotatable on the sleeve 41 and a lower race 49 secured to the sleeve by a set screw 50. By this arrangement the lower race 49 will turn with the sleeve 41 upon operation of the handle 44 and dependent upon the direction of turn of the handle, the sleeve and lower race will be raised and/or lowered by the screw action between the threading 42 and the boss 43. The upper race 48 of the thrust bearing 47 will, of course, follow the up and down movement of the lower race but, having no other connection with the sleeve, will not necessarily turn therewith.

Referring now to the sealing means 35 of the drawing, the cylindrical wall 28 of the hood has a band or rim 51, preferably of metal, secured thereto as by welding or the like. This band 51 is secured to the wall 28 sufficiently above the open end 29 of the same to receive and support a band 52 of yieldable material such as rubber and a lower band 53 both of which have sliding connection upon the cylindrical wall 28 so as to be shiftable relative thereto.

The two lower bands 52 and 53 are supported upon the cylindrical wall 28 by a plurality of brackets 55, preferably three or more and in the present disclosure four such brackets each suspended from the upper race 48 of the thrust bearing 47 in spider web fashion. More specifically each individual bracket 55 has its upper end 56 secured to a bushing ring 57 so as to extend radially therefrom at equidistant positions relative to the circumference of the ring 57. The ring 57 rests in a shouldered portion 58 of the upper race 48 of the thrust bearing 47. Each bracket has diagonal portion 59 extending angularly outward toward the open end 29 of the hood and merging with a leg portion 59' disposed parallel to the wall 28 in spaced adjacent relation thereto. Each bracket terminates in a radially extending foot portion 60 which extends beyond the circumferencial limits of the cylindrical wall to receive and support the lower band 53 previously mentioned.

As illustrated in the drawing the foot portion 60 of each bracket 55 extends through a slot 61 formed in the cylindrical wall 28. In this manner the spider web arrangement of the brackets 55 is restrained against turning relative to the hood 26 as the sleeve 41 and lower race 49 are turned relative thereto upon turning of the handle 44.

Referring now to FIG. 3 it will be noted that the resilient rim 52, when disposed below the level of the upper surface 11' of the standpipe provides an expandable gasket which when relaxed provides sufficient clearance relative to the internal surface 30 of the wall 11 to slide up and down relative thereto. However, when the handle 44 is turned in a direction to draw the spider brackets 55 upward relative to the hood 26 the band 53 supported on the radially extending foot portions of these brackets will be raised therewith into pressing engagement with the band 52. The band 52 abutting the band 51 which is stationary relative to the hood, will thus be uniformly compressed throughout the periphery of the wall 28 and be thereby swelled outwardly (see dotted lines) into sealing engagement with the internal surface 30 of the wall 11. Thus a seal and securing of the hood relative to the standpipe is accomplished simultaneously.

Since the standard diameter of standpipes might vary I have provided means for compensating for such variances. For example, in the arrangement explained above the expandable gasket 36 when compressed might swell a quarter (¼) of an inch or better in diameter but beyond that point an effective seal and securing may become deficient.

In the event the inner diameter of the standpipe 10 is somewhat greater than normal, the seal 35 is provided with an auxiliary gasket 36'. This auxiliary gasket is likewise an endless band, preferably of rubber or the like, stretch fit around the periphery of the cylindrical wall 28 and particularly overlying the gasket 36 in shim fashion to compensate for the additional clearance space which occurs on wider mouthed standpipes.

In accordance with the present invention the auxiliary band 36' is at all times available for use and for ready transposition between stored and useable positions. To this end the band 36' is provided with an enlarged integral bead-like marginal edge 63 adapted to rest in the cove-like shelf 64 provided between the upper edge 65 of the fixed rim 51 and the cylindrical wall 28 of the hood. The bead 63 is of a diameter slightly larger than the width of the rim 51 and the remainder of the band 36' is a flat skirt-like portion 66 of lesser thickness than the width of the rim 51 or diameter of the bead 63. This skirt-like portion 66 which is the shim band, when in non-use, is disposed innermost or flat against the periphery of the cylindrical wall 28 so as to be up and out of the way. Now, when the shim band 66 is to be used, the resilient band 52 will, of course, be in its relaxed condition, namely decompressed or non-expanded. The band 66 being of resilient or stretchable material, a person grips the free unbeaded edge 67 of the same and swings it down over the expandable band 52. It should here to noted that the bead 63, being substantially round in cross section cooperates with the cove-like shelf 64 to provide a fixed fulcrum about which the auxiliary band can swing as it is turned inside out. This now positions the skirt portion 66 remote from the cylindrical wall 28 so as to overlay the gasket 36 and provide a shim therefor as illustrated in FIG. 1 of the drawing. Now when the handle 44 is again turned to draw the spider-like brackets 55 and pressure rim 53 upwardly to compress the band 52, the shim skirt 66 is likewise expanded outwardly into sealing and securing engagement with the inner surface 30 of the standpipe wall 11.

From the foregoing it will be appreciated that I have provided a simple, inexpensive yet effective arrangement for simultaneously sealing and securing a hood type flow regulator to an irrigation standpipe.

The gasket 36 being of resilient material, it will normally resume its relaxed condition as seen in solid lines in FIG. 3 when the pressure rim 53 is released upon reversed turning of the handle 44 associated with the sleeve 41. The gasket 36 therefore acts as a means for urging the spider-web like brackets 55, their retaining ring 57 and the upper race 48 of the bearing 47 downwardly as the lower race 49 is lowered by reverse turning of the sleeve 41. Thus the two races 48 and 49 of the thrust bearing 47 are maintained in operative relation by the tendency of the gasket to resume its relaxed condition.

While I have described the device of the drawings in specific detail it will be appreciated that it is susceptible to variations, alterations and/or modifications without departing from the spirit of my invention. I therefore desire to avail myself of all variations, alterations and/or modifications as fairly come within the purview of the appended claims.

What I claim as new and desire to protect by Letters Patent is:

1. A seal and securing means between a flow regulator and an irrigation standpipe comprising a fixed abutment circumscribing said flow regulator, a resilient rim of gasket material surrounding said flow regulator in abutting relation to said fixed abutment thereon, a presser rim mounted for sliding movement on said flow regulator in abutting relation to said resilient rim, and means for urging said presser rim under pressure toward said fixed abutment for compressing said resilient rim thereby swelling the same into sealing engagement with the inner surface of said irrigation standpipe, said last named means comprising a screw mounted on said flow regulator for movement coaxially of said presser rim, and a plurality of brackets suspended from said screw each having a foot portion supporting said presser rim in abutting relation to said resilient rim.

2. In a flow regulator for an irrigation standpipe wherein the flow regulator is a cap-like hood having a closed top and an open bottomed cylindrical portion dimensioned for slip fit open end down relative to the internal surface of said standpipe; a seal and securing means comprising a fixed abutment circumscribing said cylindrical portion of said flow regulator, a resilient rim of gasket material surrounding said cylindrical portion in abutting relation to said fixed abutment thereon, a presser rim mounted for sliding movement on said cylindrical portion in abutting relation to said resilient rim, and means for urging said presser rim under pressure toward said fixed abutment for compressing said resilient rim and thereby swelling the same into sealing engagement with the internal surface of said irrigation standpipe comprising a screw mounted on said closed top of said hood for operation externally thereof, a hub-like sleeve mounted on said screw for rotation relative thereto, a thrust bearing secured to said screw for raising and lowering said hub-like sleeve, said cylindrical portion of said hood having a plurality of slots formed therein in the region of said presser rim, and a plurality of spoke-like brackets on said hub-like sleeve extending through said slots for guidance thereby and for supporting said presser rim in abutting relation to said resilient rim.

3. In a flow regulator for an irrigation standpipe wherein the flow regulator is a cap-like hood having an open bottomed cylindrical portion dimensioned for slip fit open end down relative to the internal surface of said standpipe; a seal and securing means comprising a fixed abutment circumscribing sadi cylindrical portion of said flow regulator, a resilient rim of gasket material surrounding said cylindrical portion in abutting relation to said fixed abutment thereon, a presser rim mounted for sliding movement on said cylindrical portion in abutting relation to said resilient rim, and means for urging said presser rim under pressure toward said fixed abutment for compressing said resilient rim and thereby swelling the same into sealing engagement with the internal surface of said irrigation standpipe, said last named means comprising a screw mounted on said flow regulator for movement coaxially of said presser rim, and a plurality of brackets suspended from said screw each having a foot portion supporting said presser rim in abutting relation to said resilient rim.

4. The combination with a cylindrical standpipe and an inverted pot-like hood having a cylindrical wall so dimensioned relative to the inner surface of said standpipe as to have slip fit open end down into said cylindrical standpipe for capping the latter to control the flow of water therefrom; means for effecting a water tight seal between said cylindrical wall and said standpipe and for providing a securing means between said cylindrical wall and the inner surface of said irrigation standpipe comprising a fixed abutment member circumscribing said cylindrical wall, a resilient rim of gasket material surrounding said cylindrical wall and having abutting relation with said fixed abutment member thereon, a presser rim mounted for sliding movement on said cylindrical wall and cooperating with said fixed abutment member for embracing said resilient rim between them, and means for urging said presser rim under pressure toward said fixed abutment member for compressing said resilient rim between them to thereby swell said resilient rim outwardly into sealing engagement with the inner surface of said irrigation standpipe comprising a plurality of circumferentially spaced slots formed in said cylindrical wall in the region of said presser rim, an externally operated centrally mounted sleeve in said pot-like hood, for up and down movement manually relative thereto, and a plurality of spoke-like brackets extending radially from said sleeve through said slots for supporting said presser rim in abutting relation to said resilient rim.

5. The combination with a cylindrical standpipe and an inverted pot-like hood having a cylindrical wall so dimensioned relative to the inner surface of said standpipe as to have slip fit open end down into said cylindrical standpipe for capping the latter to control the flow of water therefrom; means for effecting a water tight seal between said cylindrical wall and said standpipe and for providing a securing means between said cylindrical wall and the inner surface of said irrigation standpipe comprising a fixed abutment member circumscribing said cylindrical wall, a resilient rim of gasket material surrounding said cylindrical wall and having abutting relation with said fixed abutment member thereon, a presser rim mounted for sliding movement on said cylindrical wall and cooperating with said fixed abutment member for embracing said resilient rim between them, means for urging said presser rim under pressure toward said fixed abutment member for compressing said resilient rim between them to thereby swell said resilient rim outwardly into sealing engagement with the inner surface of said irrigation standpipe, and an auxiliary gasket comprising a flat, skirt-like stretchable band of resilient material stretchd fit about the periphery of the cylindrical wall above said abutment member thereon and adapted to be manually stretched inside out so as to overlay said resilient rim to provide a shim therefor, said band having a bead-like edge disposed in the cove-like shoulder provided between said abutment member and the adjacent periphery of said cylindrical wall to provide a fulcrum for said skirt-like band as it is manually turned inside out to overlay said resilient rim.

6. The combination with a cylindrical standpipe and the shaft of a key for operating a valve at the base thereof, of means for capping said standpipe to control the flow of water therefrom comprising an inverted pot-like hood having a panel top secured to a cylindrical wall so dimensioned relative to the inner surface of said standpipe as to have slip fit open end down into said cylindrical standpipe, means for simultaneously effecting a water tight seal between said cylindrical wall and said standpipe and for securing said cylindrical wall to the inner surface of said irrigation standpipe comprising an abutment rim circumscribing the exterior surface of said cylindrical wall, a resilient rim of gasket material surrounding said cylindrical wall and having abutting relation with said abutment rim thereon, a presser rim mounted for sliding movement on said cylindrical wall and cooperating with said fixed abutment for embracing said resilient rim between them, and means for urging said presser rim under pressure toward said fixed abutment for compressing said resilient rim between them to thereby swell said resilient rim outwardly into sealing engagement with the inner surface of said irrigation standpipe comprising a sleeve threadedly mounted on said panel top having the shaft of said key passing therethrough, a plurality of radially disposed brackets suspended spider fashion from said sleeve internally of said hood, each said bracket having a portion thereof engaging said presser rim for supporting the latter on said cylindrical wall, and a handle on the exteriorly disposed end of said sleeve for turning the latter screw fashion relative to said hood.

7. The combination with a cylindrical standpipe having a key shaft for operating a valve at the base thereof, and an inverted pot-like hood having a panel top secured to a cylindrical wall so dimensioned to have slip fit open end down into said cylindrical standpipe for capping said standpipe to control the flow of water therefrom; means for effecting a water tight seal between said cylindrical wall and standpipe and for securing said cylindrical wall to the inner surface of said irrigation standpipe comprising a fixed shoulder abutment circumscribing said cylindrical wall, a resilient rim of gasket material surrounding said cylindrical wall and having abutting relation with said fixed abutment thereon, a presser rim mounted for sliding movement on said cylindrical wall and cooperating with said fixed abutment to embrace said resilient rim, a screw sleeve threadedly mounted on said panel concentric to said cylindrical wall for movement coaxially thereof for supporting said key shaft relative thereto, a plurality of brackets suspended from said screw sleeve within said hood and each having a foot portion extending beyond the perimeter of said cylindrical wall thereof for supporting said presser rim in abutting relation to said resilient rim, and a handle on said screw sleeve externally of said hood for drawing said brackets upwardly relative to said hood for urging said presser rim under pressure toward said fixed abutment to compress said resilient rim and thereby swell the same into sealing and securing engagement with the inner surface of said irrigation standpipe.

8. In an arrangement in which a hood-like flow regulator is releasably secured to the internal wall of a cylindrical irrigation standpipe by an expandable gasket providing a shoulder-like abutment between its upper end and the adjacent periphery of the cylindrical wall of said hood-like flow regulator; an auxiliary gasket shim comprising a flat skirt-like stretchable band of resilient material stretch fit about the periphery of said cylindrical wall above the shoulder-like abutment thereon, said band being manually stretchable inside-out at the option of a user so as to overlay said expandable gasket to provide a shim therefor, said band having a bead-like edge disposed on said shoulder-like abutment to provide a fulcrum for said skirt-like band as it is manually turned inside-out toward overlaying position relative to said expandable gasket.

9. In an arrangement in which an inverted pot-like hood having a panel top and a cylindrical wall is so dimensioned as to have slip fit open end down into an irrigation standpipe provided with a key shaft operated valve at its base; means for effecting a seal and securing means between said cylindrical wall and the inner surface of said irrigation standpipe comprising a fixed abutment circumscribing said cylindrical wall and cooperating therewith to provide a cove-like shoulder, a resilient rim of gasket material surrounding said cylindrical wall and having abutting relation with said fixed abutment thereon, a presser rim mounted for sliding movement on said cylindrical wall and cooperating with said fixed abutment for embracing said resilient rim between them, a sleeve screw mounted concentrically of the panel top of said flow regulator for movement coaxially thereof, a key shaft extending through said sleeve for keyed connection to said valve, a plurality of brackets within said hood suspended from said sleeve screw and each having a foot portion operatively connected to said presser rim, and a handle on said sleeve screw exteriorly of said hood for turning said sleeve screw to thereby raise and lower said brackets and the presser rim connected thereto whereby to swell and release said resilient rim into and out of sealing engagement relative to the inner surface of said irrigation standpipe.

10. In an arrangement in which an inverted pot-like hood having a panel top and a cylindrical wall is so dimensioned as to have slip fit open end down into an irrigation standpipe provided with a key shaft operated valve at its base; means for effecting a seal and securing means between said cylindrical wall and the inner surface of said irrigation standpipe comprising a fixed abutment circumscribing said cylindrical wall and cooperating therewith to provide a cove-like shoulder, a resilient rim of gasket material surrounding said cylindrical wall and having abutting relation with said fixed abutment thereon, a presser rim mounted for sliding movement on said cylindrical wall and cooperating with said fixed abutment for embracing said resilient rim between them, a sleeve screw mounted concentrically of the panel top of said flow regulator for movement coaxially thereof, a key shaft extending through said sleeve for keyed connection to said valve, a plurality of brackets within said hood suspended from said sleeve screw and each having a foot portion operatively connected to said presser rim, a handle on said sleeve screw exteriorly of said hood for turning said sleeve screw to thereby raise and lower said brackets and the presser rim connected thereto whereby to swell and release said resilient rim into and out of sealing engagement relative to the inner surface of said irrigation standpipe, and an auxiliary gasket shim comprising a flat skirt-like stretchable band of resilient material stretch fit about the periphery of said cylindrical wall above said fixed abutment thereon, said band being manually stretchable between said aforesaid position and an inside-out condition in which it overlays said resilient rim to provide a shim therefor, said band having a bead-like edge disposed on the cove-like shoulder between said fixed abutment and the adjacent periphery of said cylindrical wall to thereby provide a fulcrum for said skirt-like band as it is manually stretched and turned between its two positions in relation to said hood.

11. A seal and securing means between a flow regulator and an irrigation standpipe having a key co-axially thereof, said seal and securing means comprising a fixed abutment circumscribing said flow regulator, a resilient rim of gasket material surrounding said flow regulator in abutting relation to said fixed abutment thereon, a presser rim mounted for sliding movement on said flow regulator in abutting relation to said resilient rim, and means for urging said presser rim under pressure toward said fixed abutment for compressing said resilient rim thereby swelling the same into sealing engagement with the inner surface of said irrigation standpipe comprising a sleeve mounted on said key, means connected to said sleeve and manually operated externally of said flow regulator for raising and lowering said sleeve relative thereto, and a plurality of spoke-like brackets extending radially from said sleeve and having their ends disposed below said presser rim for supporting the latter in abutting relation to said resilient rim.

References Cited in the file of this patent
UNITED STATES PATENTS

| | | |
|---|---|---|
| 2,158,829 | Miller | May 16, 1939 |
| 2,923,308 | Shohan | Feb. 2, 1960 |